United States Patent [19]

Eckle

[11] 4,014,623
[45] Mar. 29, 1977

[54] BORING ROD EXTENSION WITH TWO COUNTER-ROTATING BORING TOOL CARRIERS

[75] Inventor: Otto Eckle, Lochgau, Germany

[73] Assignee: KOMET Stahlhalter-und Werkzeugfabrik, Robert Breuning GmbH, Besigheim, Germany

[22] Filed: Nov. 26, 1974

[21] Appl. No.: 527,225

[30] Foreign Application Priority Data

Dec. 1, 1973 Germany .......................... 2360000

[52] U.S. Cl. ..................... 408/183; 408/713
[51] Int. Cl.² ................. B23B 29/034; B23B 51/00
[58] Field of Search .......... 408/183, 182, 181, 154, 408/155, 156, 713, 147, 153, 157, 158, 161, 179, 185

[56] References Cited

UNITED STATES PATENTS

| | | | |
|---|---|---|---|
| 1,563,108 | 11/1925 | Prance | 408/154 X |
| 3,697,187 | 10/1972 | Faber et al. | 408/154 |
| 3,700,346 | 10/1972 | Eckle | 408/153 |
| 3,724,965 | 4/1973 | Green | 408/183 |
| 3,738,767 | 6/1973 | Benjamin et al. | 408/161 |
| 3,767,317 | 10/1973 | Ortlieb | 408/183 |

Primary Examiner—Frank T. Yost
Assistant Examiner—Z. R. Bilinsky
Attorney, Agent, or Firm—Woodhams, Blanchard and Flynn

[57] ABSTRACT

An extension for a boring rod with two counter-rotating boring tool carriers. The boring tools of the carriers are arranged at opposite ends of the boring tool carrier and displaced through 180° relative to each other. The boring tool carriers have a cylindrical shaft and are each guided within a chuck socket, which sockets have a cone on their external ends and both sockets are arranged within a through longitudinal bore in a housing capable of being mounted within the boring rod. Threaded rings are screwed into each end of the longitudinal bore and act in conjunction with the chuck socket through their internal conical part to effect an axial seating between the inner end of the chuck socket and an adjusting bushing, movable within the longitudinal bore, which engages by means of two threads running counter to each other with the corresponding threads of the boring tool carrier. A centering device is provided between the housing and the boring rod.

10 Claims, 3 Drawing Figures

BORING ROD EXTENSION WITH TWO COUNTER-ROTATING BORING TOOL CARRIERS

FIELD OF THE INVENTION

This invention relates to an extension for a boring rod having a pair of counter rotating boring tool carriers supporting boring tools thereon 180° offset from each other.

BACKGROUND OF THE INVENTION

In a known boring rod extension of this type (see DT-OS 1752 014) the boring tool carriers project freely above the two ends of the housing.

They are thus, in particular when they are adjusted to their outermost position by means of the adjusting bushing, not strong enough to be able to carry out coarser work with known tools, that is rough work with greater removal of swarf. In addition, with the known tool the boring tool carrier is mounted in bearings to be unable to rotate within the chuck socket and the chuck socket is mounted so as to be unable to rotate within the housing, for which purpose it is necessary, in each case, to provide grooves and pins, which increases the manufacturing costs.

The basic object of the invention is therefore to design an extension for a boring rod, of the type described in the introduction, such that the boring tool carriers are better supported and the extension also has a simpler construction.

This is achieved according to the invention in that the housing has a projection with, in each case, a plane supporting surface on the side turned away from the boring tool, on which said supporting surface there is supported a part of the boring tool carrier which is broadened out relative to the cylindrical shaft by means of a similar supporting surface. Since the projection is rigidly joined to the housing, that is it forms a single unit with it, the boring tool carrier is securely supported even when it is in its outermost position. Because of the marked increase in strength thus produced, not only is coarser work with a greater removal of swarf possible; but the accuracy of performance of the tool in fine turning is increased. At the same time the plane supporting faces prevent rotation of the boring tool carrier relative to the housing, so that guide pins and grooves on the boring tool carrier, previously used to prevent such rotation, are no longer necessary. In addition, the plane surface of application offers an effective protection against rotation due to the markedly higher forces produced during coarser working.

The projection conveniently extends, on the side turned away from the boring tool up to about the level of the axis of the boring tool carrier. In this way it is also possible to achieve support of the boring tool carrier in the axial direction of the boring rod, that is in the direction of feed.

Further, the broadened out part of the boring tool carrier advantageously has substantially the same breadth as the housing and its projection, so that the boring tool projects somewhat beyond the housing in the axial direction of the boring rod. Because of this, it is also possible to work blind holes and collar fittings within a bore. In addition, it is possible with this design to employ a substantially larger interchangeable and rotatable cutting plate as the boring tool. The above-mentioned increased strength of the whole tool is thus also to be taken into account in the sense that it is possible to undertake a larger removal of swarf with larger cutting plates.

BRIEF DESCRIPTION OF THE DRAWINGS

The invention is described in more detail in the following with reference to the examples of embodiment illustrated in the drawing, in which.

DETAILED DESCRIPTION

Figure 2:
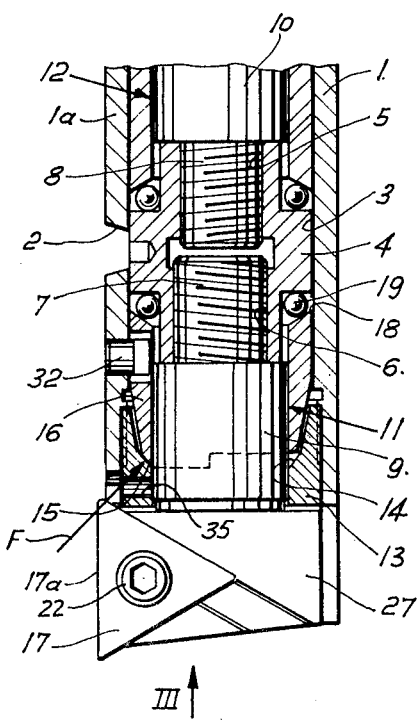
FIG. 2 is a partial section through the same on an enlarged scale.

In the drawing a housing is denoted by 1 and is conveniently designed as a squared block being such that a boring rod (not illustrated) can be mounted in a corresponding recess at the front end. The housing has a trapezoidal centering groove 2 on its front face 1a. The boring rod is also provided with a similar centering groove on its front face. A common centering wedge, not illustrated, engages with both and thus centres the boring rod extension in relation to the boring rod, as is described in DT-OS 2 209 516 . The housing 1 has a through longitudinal bore 3 within which the adjusting bushing 4 is rotatably and movably guided. The adjusting bushing 4 has two internal threads 5 and 6 running counter to each other which act in conjunction with externally threaded pins 7 and 8, which for their part are mounted on the cylindrical shafts 9 and 10 of the boring tool carriers, denoted as a whole by 11 and 12. At each end of the longitudinal bore 3, externally threaded rings 13 having an internal cone 14 are threadedly engaged with an internal thread in the bore 3 and act in conjuction with an external cone 15 on the chuck socket 16. The chuck socket 16 surrounds the cylindrical shaft 9 of the boring tool carrier and has a multiplicity of slits in the ends turned towards the boring tool 17. Conveniently, the inner end of each chuck socket has a conical surface 18 which is supported directly on the balls 19 of an anti-friction bearing. The balls 19, for their part, are supported against a collar or shoulder on the adjusting bushing 4. Because of the conical surface 18 the balls 19 are pressed radially inwards and centre the adjusting bushing, thus increasing the accuracy of setting. The design of the chuck socket and the threaded rings is similar in the boring tool carrier 12, illustrated in part only in Fig. 2, except that in the said boring tool carrier the corresponding boring tool 20 is arranged so as to be displaced through 180° relative to the boring tool 17. Both boring tools may be designed as interchangeable triangular turning-cutting plates, each of which is mounted on the boring tool carrier by means of a clamping screw 22.

Figure 1:
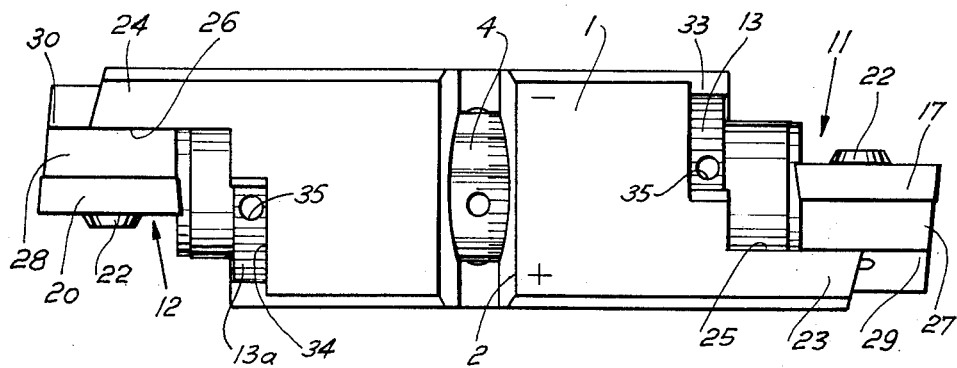
FIG. 1 is a front view of the boring rod extension.

As can be seen in FIG. 1, in particular, the housing 1 is provided on each of its faces turned away from the boring tools 17 and 20, respectively, with a projection 23 and 24. Each projection has a plane front surface 25 or 26, against which a part 27, 28 of the boring tool carrier 11, 12 which is broadened out relative to the cylindrical rod 9, 10 is supported by means of a similar supporting surface 29, 30. The supporting surfaces 25,26 of the two projections 23, 24 are here inclined at an angle somewhat less than 15°,so that the profile at this position becomes higher and thus more rigid. By means of this design, in the first place, there is achieved a stable support of each of the boring tool carriers approximately in the direction of the pressure during cutting, while, at the same time, rotation of the boring tool carrier is also prevented. In addition, the broadened out part 27, 28 of each boring tool carrier has the advantage that a larger cutting plate can be mounted on it. The broadened out part 27, 28 of each boring tool carrier has about the same breadth as the housing 1, so that the boring tool or the cutting plate 17, 20 projects somewhat beyond the housing in the axial direction of the boring rod. The advantages achieved by this arrangement have already been discussed above, Conveniently, each projection 23, 24 extends, on the side turned away from the cutting edge 17a of the boring tool 17 about to the level of the axis of the boring tool carrier 11 or 12. In this way good support of the boring rod is achieved in the axial direction as well, that is in the direction of feed.

Since the threaded rings 13, 13a conveniently have a right hand thread, it is possible that when the threaded rings are tightened the chuck socket will also be affected and in this way the broadened out part 27, 28 will be lifted off its corresponding supporting surface 25, 26.

In order to prevent this, it is convenient for the broadened out part 27 to have a groove 30 on the side turned away from the boring tool 17, within which there engages a spring 31 extending in the axial direction of the boring tool carrier and attached to the projection 23. This effectively prevents rotation of the boring tool carrier away from the supporting surface 25.

It is also worth noting that each of the two projections 23, 24 forms a type of angle profile in that it extends to the rearmost part of the boring tool carrier about to the level of the axis of said carrier, and this profile has an increased moment of resistance and thus also a greater rigidity.

In order to increase the accuracy of setting still further it is advantageous for the cone 15 on the chuck socket 16 to be displaced through a region greater than 180°, and preferably 240°, relative to the cutting edge of the boring tool 17. In this case the chuck socket 16 should be secured against rotation by means of a screw 32, so that it is not shifted when tightening-up or loosening the screw rings 13. In this manner transfer of force from the screw rings to the chuck socket occurs only over a region extending through 120°, and then in the same direction as that in which the cutting and feed pressures also act. On account of the steep surface of the cone a force is produced in the direction of the arrow F which presses the threaded pin 7 firmly into engagement with the thread 6 of the adjusting bushing 4. By this means any play in the threaded connection is compensated. At the same time, however, the broadened out part 27 is pressed against the raised part of the projection 23, so that any play here is also compensated.

Figure 3:
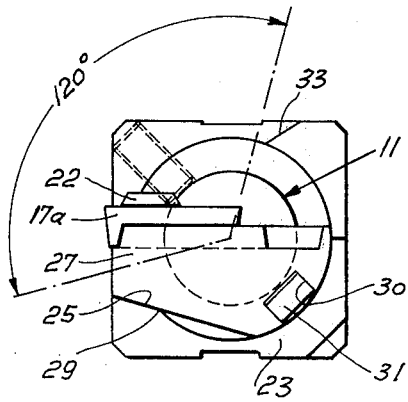
FIG. 3 is a front view in the direction III of FIG. 2.

In order to ensure true application of the threads and the broadened out parts, the centre of the 120° region should be displaced upwards through somewhat less than 45° relative to the cutting edge 17a. The position of the 120° region is indicated in FIG. 3, while in FIG. 2 this region is shown as displaced through 45°, on the one hand for the purpose of showing the screw 32 and, on the other hand, in order to make clear that this region extends only over the smaller part of the total circumference of the chuck socket.

By loosening or tightening the threaded rings 13, 13a it is not only possible to alter the clamping force of the chuck socket 16, but it is also possible to move the boring tool carrier relative to the housing 1 within the longitudinal bore 3, and thus to centre it, by loosening the one screw ring and tightening the other. In order to simplify this adjustment operation it is convenient for the housing 1 to have a recess 33, 34 on each of the sides turned towards the cutting edge of the boring tool 17 in the neighbourhood of the threaded rings 13, 13a.

The limit of each recess in the circumferential direction forms an easily visible marking which acts in conjunction with a setting scale provided on the circumference of each of the threaded rings. In order to move the threaded rings radial borings 35 are conveniently provided in the threaded rings for the insertion of a not illustrated manipulating pin. By means of the scales provided on the threaded rings quick centering is possible since each graduation of the scale corresponds, for example, to an axial displacement of 0.02 mm. Adjustment can be carried out quickly and purposefully, by determining how far each of the two cutting edges projects relative to the centre of the housing. The centre of the housing is established by the centering groove 2.

If the difference is halved and one screw ring is then opened by an amount corresponding to the quantity thus determined and subsequently the other screw ring is tightened by the same amount, then, as a rule, a relatively exact adjustment will be obtained which can be further improved by repeated measurements.

The embodiments of the invention in which an exclusive property or privilege is claimed are defined as follows:

1. A boring rod extension, comprising:

elongated housing means having an opening extending therethrough;

a first tool carrier mounted in said opening and having a portion thereof extending axially outwardly of said opening, said portion having a first cutting tool mounted thereon and a first supporting surface spaced from said first cutting tool;

first projection means on at least one end of said elongated housing means and projecting outwardly of said housing means in a direction parallel to the axis of said opening, said projection means having a second supporting surface thereon engaged by said first supporting surface on said first tool carrier;

first adjustable coupling means for axially adjustably and fixedly coupling said first tool carrier in said opening of said housing means and maintaining the engagement between said first and second supporting surfaces for effecting a transfer of forces acting on said first tool carrier directly to said projection means to thereby strengthen the connection of said first tool carrier to said housing means;

a second tool carrier mounted in said opening and having a portion thereof extending axially outwardly of said opening but in a direction opposite to said first tool carrier, said portion of said second tool carrier having a second cutting tool mounted thereon and a third supporting surface spaced from said second cutting tool;

second projection means on an end of said housing means snd projecting outwardly of said housing means in a direction parallel to the axis of said opening and opposite to said first projection means, said second projection means having a fourth supporting surface thereon engaged by said third supporting surface on said second tool carrier;

second adjustable coupling means for axially adjustably and fixedly coupling said second tool carrier in said opening of said housing means and maintaining the engagement between said third and fourth support surfaces for effecting a transfer of forces acting on said second tool carrier directly to said second projection means to thereby strengthen the connection of said second tool carrier to said housing means, said first and second adjustable coupling means including an adjusting bushing mounted in said opening and has a pair of axially spaced first connecting means thereon and said first tool carrier and said second tool carrier each have second connecting means thereon for connectingly cooperating with said first connecting means, a chuck socket encircling each of said first and second tool carriers, each of said chuck sockets having an external conical surface separated by a region extending over more than 180° in relation to a cutting edge on each of said cutting tools; and securing means for securing each of said chuck sockets against rotation relative to said housing means.

2. A boring rod extension according to claim 1, wherein said portion of each of said first and second tool carriers has a pair of spaced surfaces thereon, said cutting tools being mounted on one of said surfaces, said first and third supporting surface being defined by the other of said surfaces.

3. A boring rod extension according to claim 2, wherein each of said pair of surfaces are opposed to each other.

4. A boring rod extension according to claim 2, wherein said one of said surfaces of each pair is parallel to the axis of said tool carrier.

5. A boring rod extension according to claim 2, wherein said one of said surfaces of each pair is about at the level of the axis of said tool carrier.

6. A boring rod extension according to claim 1, wherein said first and second projection means each have a width equal to the width of said housing means.

7. A boring rod extension according to claim 1, wherein said first and second adjustable coupling means each include a groove in said portion of each of said first and second tool carrier and a spring mounted on each of said first and second projection means, each of said springs being received in said groove to effect said maintaining of said engagement between said first and second supporting surfaces and said third and fourth supporting surfaces.

8. A boring rod extension according to claim 1, wherein said adjusting bushing has oppositely facing shoulders thereon;
  wherein each of said chuck sockets has a second conical surface on an end remote from said external conical surface and adjacent said shoulders on said adjusting bushing; and
  including a plurality of balls positioned between and engaging said shoulders and each of said second conical surfaces to effect a centering of said chuck sockets in said opening.

9. A boring rod extension according to claim 1, wherein said first and second adjustable coupling means further includes a threaded ring for each of said chuck sockets and having an internal cone receiving said external cones therein, each of said threaded rings being threadedly engaged with said housing means and having a part exposed to the exterior of said housing means, a recess in each of said parts for permitting the use of a tool to threadedly adjust said rings while in said opening.

10. A boring rod extension according to claim 1, wherein said housing means has a square profile in lateral cross section thereof.

* * * * *